Patented Sept. 20, 1932

1,878,698

UNITED STATES PATENT OFFICE

WINFRID HENTRICH AND MAX HARDTMANN, OF WIESDORF-ON-THE-RHINE, GERMANY, ASSIGNORS TO GENERAL ANILINE WORKS, INC., OF NEW YORK, N. Y., A CORPORATION OF DELAWARE

PIGMENT DYESTUFFS

No Drawing. Application filed September 19, 1929, Serial No. 393,838, and in Germany September 22, 1928.

The present invention relates to new water resistant pigment dyestuffs, more particularly it relates to pigment dyestuffs of the general formula

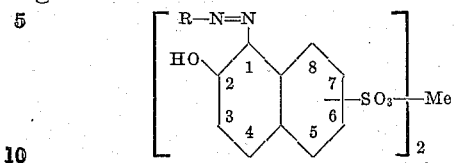

wherein R stands for an aromatic nucleus of the benzene or naphthalene series which is at least once substituted by a halogen atom and which may be further substituted by alkyl, alkoxy or a carboxylic acid group, and "Me" stands for an alkaline earth metal atom, the group $-SO_3Me$ standing in 6 or 7 position.

Our new pigment dyestuffs are obtainable by diazotizing in the usual manner a suitable aromatic amine being at least once substituted by a halogen atom, coupling the diazo compound with 2-naphthol-6-(or 7)-sulfonic acid and precipitating the pigment dyestuff by adding to the solution of the azo dyestuff an aqueous solution of a salt of an alkali earth metal, such as barium or calcium chloride, and if desired in the presence of a suitable substratum, for example heavy spar and magnesia usta.

Our new pigment dyestuffs, in particular the calcium and barium pigment dyestuffs or lacquers, possess excellent resistivity to water and oil besides satisfactory fastness to light. The shade of the new substances generally varies between yellow and bluish red.

The invention is illustrated by the following example, but is not restricted thereto:—

A dyestuff composition capable of being used in the low pressure process is prepared as follows:—17 parts of gilsonite-asphalt are dissolved at 40–50° C. in 40 parts of xylene. To this solution there are added while thoroughly stirring 2–3 parts of the barium salt of the dyestuff 2-chloro-aniline-azo-2-naphthol-6-sulfonic acid and 14–15 parts of magnesia usta, made into a paste with 26 parts of xylene. When desired or necessary the mass is brightened in addition, with a small quantity of a fast soluble dyestuff.

Printings produced with this low pressure paste are completely water-resistant after drying.

The following table of useful pigment dyestuffs or lacquers serves to further illustrate the invention by way of example:—

| Diazo component | Coupling component | Shade |
|---|---|---|
| 2-chloroaniline | 2-naphthol-6-sulfonic acid | Reddish-orange |
| 3-chloroaniline | 2-naphthol-6-sulfonic acid | Orange |
| 4-chloroaniline | 2-naphthol-6-sulfonic acid | Orange |
| 2.4-dichloroaniline | 2-naphthol-6-sulfonic acid | Red-orange |
| 2.5-dichloroaniline | 2-naphthol-6-sulfonic acid | Orange |
| 3.5-dichloroaniline | 2-naphthol-6-sulfonic acid | Ba: Yellowish-orange Ca: Orange |
| 3.4-dichloroaniline | 2-naphthol-6-sulfonic acid | Red-orange |
| 2.4.6-trichloroaniline | 2-naphthol-6-sulfonic acid | Reddish-yellow |
| 4-chloro-2-toluidine | 2-naphthol-6-sulfonic acid | Yellowish-red |
| 5-chloro-2-toluidine | 2-naphthol-6-sulfonic acid | Ca: Blue-red Ba: Red-orange |
| 6-chloro-2-toluidine | 2-naphthol-6-sulfonic acid | Orange |
| 4.6-dichloro-2-toluidine | 2-naphthol-6-sulfonic acid | Orange |
| 4-chloro-2.5-dimethyl-1-aminobenzene | 2-naphthol-6-sulfonic acid | Yellowish-red |
| 2-chloro-4-toluidine | 2-naphthol-6-sulfonic acid | Orange |
| 4-chloro-2-anisidine | 2-naphthol-6-sulfonic acid | Bordeaux |
| 1-chloro-2-naphthylamine | 2-naphthol-6-sulfonic acid | Brown-red |
| 4-chloroanthranilic acid | 2-naphthol-6-sulfonic acid | Ca: Yellow-red Ba: Blue-red |
| 2-chloroaniline | 2-naphthol-7-sulfonic acid | Orange (reddish) |

We claim:—

1. As new products the pigment dyestuffs of the probable general formula

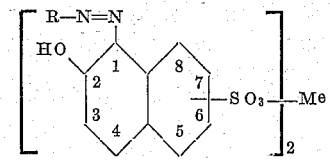

wherein R stands for an aromatic nucleus of the benezene or naphthalene series which is at least once substituted by a halogen atom and whch may be further substituted by a substituent of the group consisting of alkyl, alkoxy and the carboxylic acid group and wherein Me stands for an alkaline earth metal atom, the group $SO_3Me$ standing in one of the positions 6 and 7, said compounds being generally yellow to bluish red powders, possessing an excellent resistivity to water and oil and a satisfactory fastness to light, and being valuable dyestuffs in printing processes.

2. As new products the pigment dyestuffs of the probable general formula

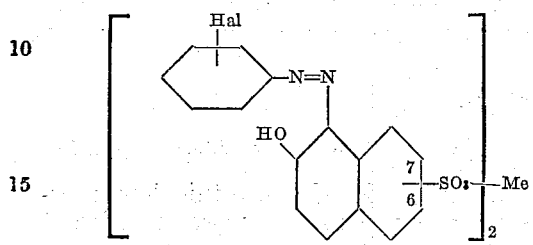

wherein Hal stands for a halogen atom, Me stands for an alkaline earth metal atom, the group $SO_3Me$ standing in one of the positions 6 and 7 and wherein the benzene nucleus may be further substituted by a substituent of the group consisting of alkyl, alkoxy and the carboxylic acid group, said compounds being generally yellow to bluish red powders, possessing an excellent resistivity to water and oil and a satisfactory fastness to light, and being valuable dyestuffs in printing processes.

3. As new products the pigment dyestuffs of the probable general formula

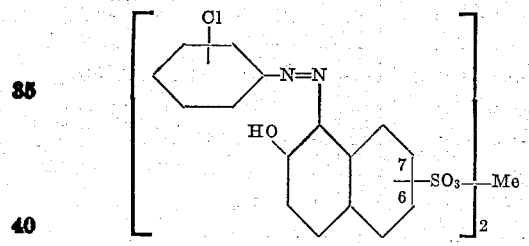

wherein Cl stands in one of the positions 2 and 4 and wherein the benzene nucleus R may be further substituted by a substituent of the group consisting of alkyl, alkoxy and the carboxylic acid group, Me stands for a metal atom of the group consisting of barium and calcium, the group $SO_3Me$ standing in one of the positions 6 and 7, said compounds being generally yellow to bluish red powders, possessing an excellent resistivity to water and oil and a satisfactory fastness to light, and being valuable dyestuffs in printing processes.

4. As a new product the barium salt of the dyestuff 2-chloro-aniline-azo-2-naphthol-6-sulfonic acid, being a reddish-orange powder, possessing an excellent resistivity to water and oil and a satisfactory fastness to light, and being a valuable dyestuff in printing processes.

In testimony whereof, we affix our signatures.

WINFRID HENTRICH. [L. S.]
MAX HARDTMANN. [L. S.]